UNITED STATES PATENT OFFICE.

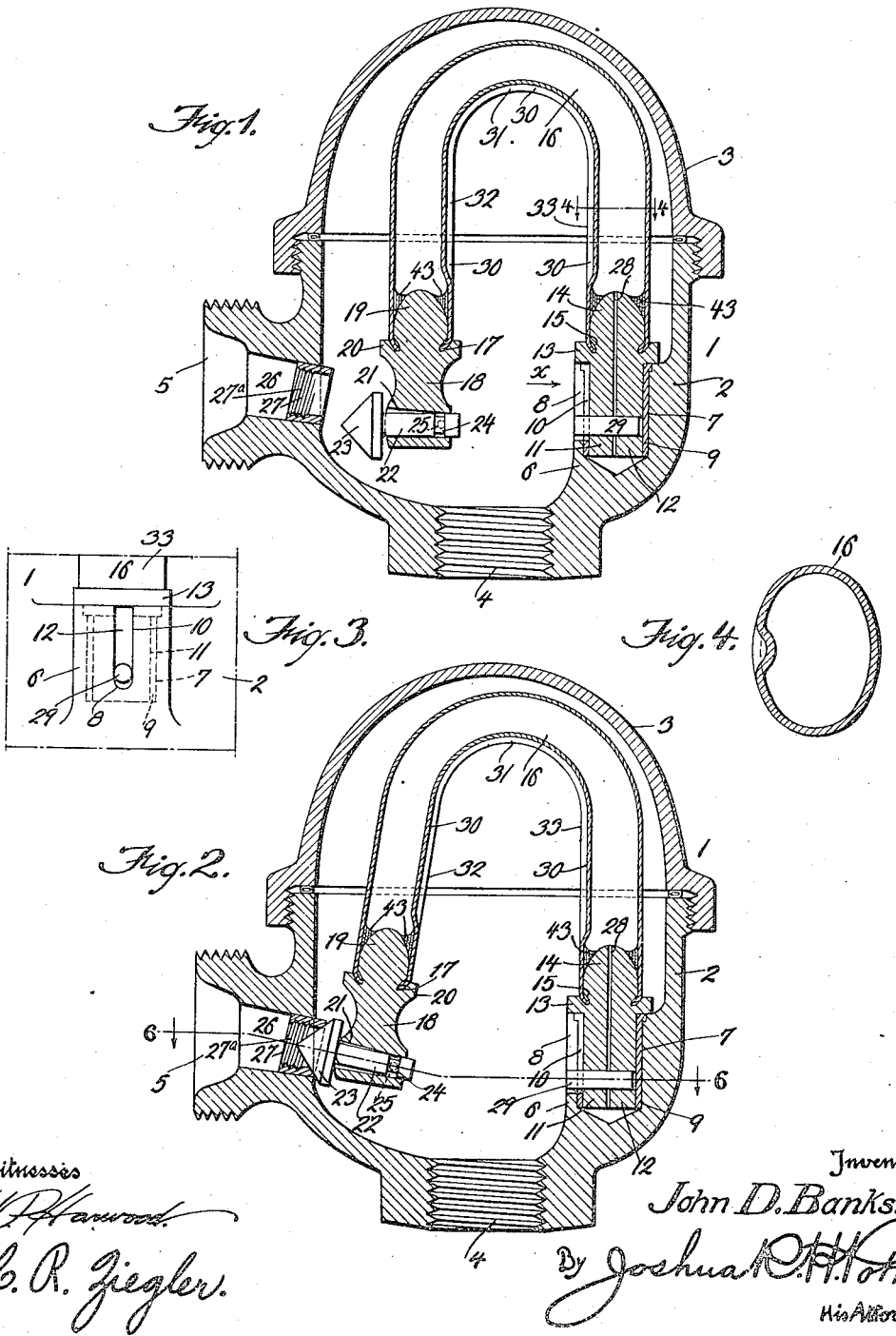

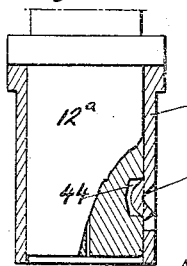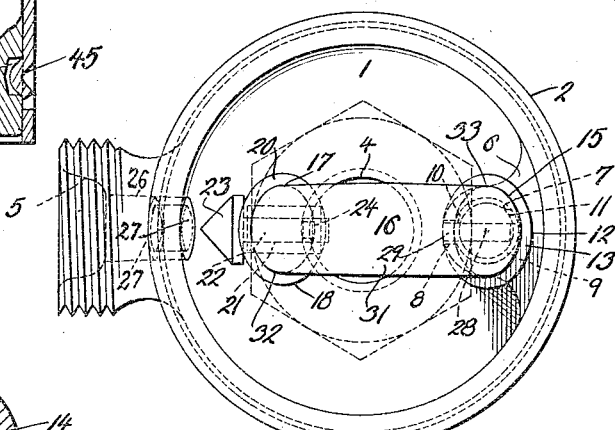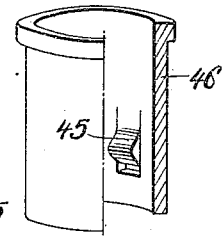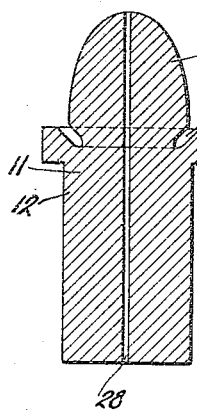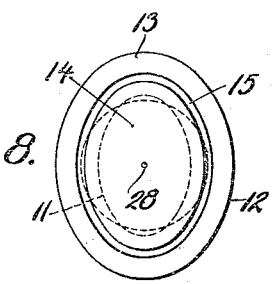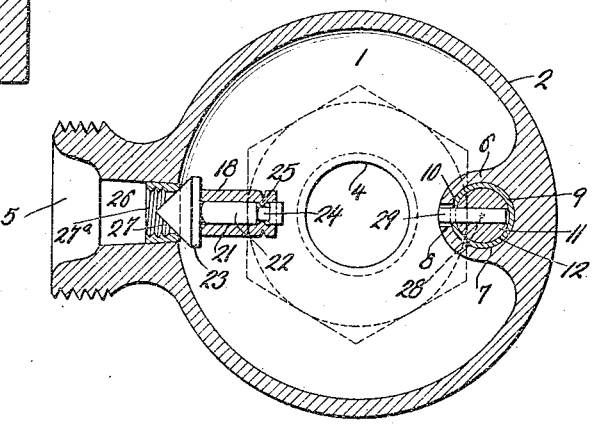

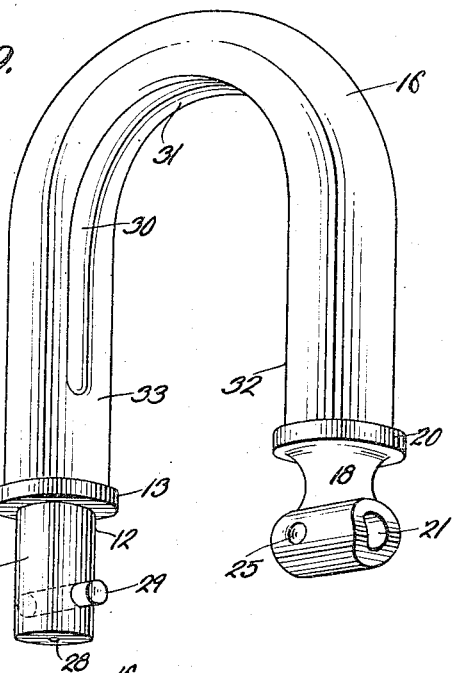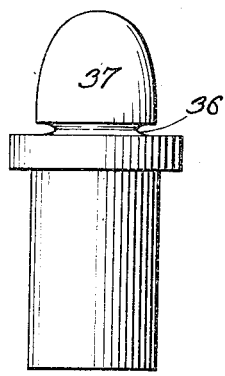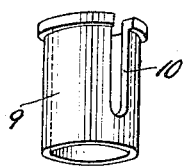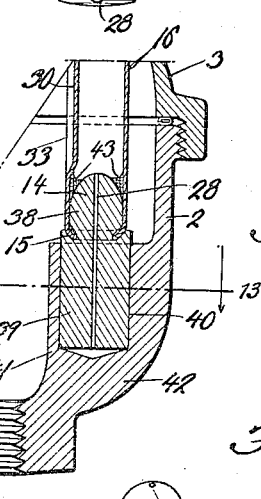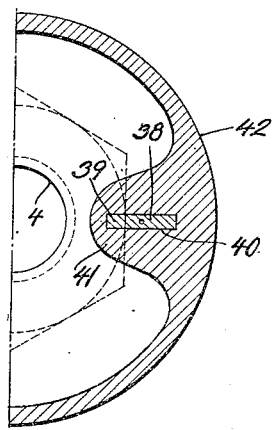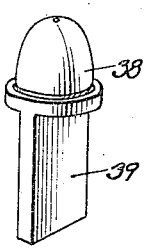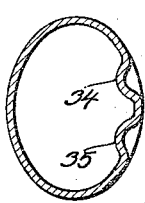

JOHN D. BANKS, OF COLWYN, PENNSYLVANIA.

THERMOSTATIC VALVE.

1,259,589.  Specification of Letters Patent.  Patented Mar. 19, 1918.

Application filed February 21, 1917.  Serial No. 150,081.

*To all whom it may concern:*

Be it known that I, JOHN D. BANKS, a citizen of the United States, residing at Colwyn, in the county of Delaware and State of Pennsylvania, have invented certain new and useful Improvements in Thermostatic Valves, of which the following is a specification.

My invention consists of improvements in thermostatic valves. One object of my invention is to provide durable thermo-acting valve mechanism which can be quickly and easily manufactured and assembled.

Another object is to so construct certain of the members thereof that they will readily respond to variation in temperature to actuate the valve proper.

These objects, and other advantageous ends which will be described hereinafter, I attain in the following manner, reference being had to the accompanying drawings in which—

Figure 1 is a sectional elevation of my invention showing the valve in an open position.

Fig. 2 is a view of similar nature to Fig. 1 showing the valve in a closed position.

Fig. 3 is a fragmentary elevation looking in the direction of the arrow "*x*" in Fig. 1.

Fig. 4 is an enlarged section on the line 4—4 of Fig. 1.

Fig. 5 is a plan view of Fig. 1 with the cap of the casing removed.

Fig. 6 is a sectional plan taken on the line 6—6 of Fig. 2.

Fig. 7 is an enlarged section of an improved terminal piece for use in connection with a thermo-acting tube which forms a part of my invention.

Fig. 8 is a top plan view of the terminal piece shown in Fig. 7.

Fig. 9 is a perspective view of my improved thermo-acting tube having terminal pieces thereon constructed and attached to the thermo-acting tube in a manner which forms a part of my invention.

Fig. 10 is a perspective view of a bushing or jacket which forms a housing for one of said terminal pieces.

Fig. 11 is an elevation showing a modification in the form of a terminal piece illustrated in Fig. 7.

Fig. 12 is a fragmentary sectional elevation showing in assembly a modified form of one of the assembly pieces.

Fig. 13 is a section on the line 13—13 of Fig. 12.

Fig. 14 is a perspective view of the terminal piece illustrated in Figs. 12 and 13.

Fig. 15 is a section through a thermo-acting tube of substantially similar construction to that shown in Fig. 4, with the exception that two ribs are formed on the inner surface of said tube, whereas in Fig. 4 only one rib is illustrated.

Fig. 16 shows a modified form of a portion of my invention.

Fig. 17 shows a fragmentary perspective view of the jacket shown in Fig. 16.

Referring to the drawings, my invention includes a casing 1 having a hollow section 2 which has a cap 3 screwed thereon. The section 2 has an inlet passage 4 and an outlet passage 5 to which pipes or other conduits may be attached.

A boss or projection 6 is formed on the inner surface of the section 2 and has a cylindrical bore 7 and a slot 8 which communicates with said bore, said slot extending substantially vertical as illustrated in Fig. 3.

A jacket 9, preferably of brass or steel, is forced within the bore 7 and has a slot 10 which registers with the slot 8 in said boss. The inner surface of said jacket 9 is preferably made cylindrical and smooth to receive a depending cylindrical portion 11 of a terminal piece 12. This terminal piece has a flange 13 and a head 14. As shown in Figs. 1 and 3, this terminal piece has a groove 15 which extends entirely around the head 14, said groove extending downwardly in a convergent manner, so that the lowermost portion of said groove is closer to the axis or center line than is the outer surface of said head at its greatest width. In other words, the groove undercuts the head.

As illustrated in Figs. 1 and 2, the groove 15 forms the intersection between the head 14 and the flange 13. The head 14 extends within one end of an inverted U-shape thermo-acting tube 16, the internal width of the tube adjacent said end being substantially the same as the width of the head at its greatest thickness, the edge portion of said end being bent or pressed within said groove 15.

The other end of said tube is bent or pressed within an undercut groove 17 in another terminal piece 18, said latter terminal piece having a head 19 of similar construction to the head 14. The groove 17 is formed in a manner similar to the groove 15 of the terminal piece 12 and undercuts the head 19, thus forming an intersection between said head and a flange 20.

The terminal piece 18 has a tapered opening 21 for receiving a stem 22 of a valve 23. The stem 22 has an annular groove 24 formed therein adjacent its free end, and the terminal piece 18 has projections 25 which extend within the groove 24, so that a slight adjustment or movement of said valve stem is possible both longitudinally and within the width of said opening 21. In other words, the tapered nature of the opening 21 permits a slight rocking movement of the valve 23 and the width of the groove 24, permits a slight longitudinal movement of the valve stem 22.

The outlet passage 5 has a tapered portion 26 into which fits a sleeve 27 which is also tapered and has internal screw-threads 27ª. The sleeve at its inner end forms a seat for the valve 23 (see Fig. 2).

The bending of the ends of the tube 16 within the grooves 15 and 17 of the terminal pieces serves to secure said terminal pieces to said tube, however, in order to form a perfect seal for the interior of the tube, I preferably place solder in said tube which, when heated, will run between the heads of the terminal pieces and into their respective grooves. This soldering forms a secure and neat sealing means and adds greatly to the strength and rigidity of the tube and terminal pieces.

Tubes of the character above described are generally filled with a solution of ether and to permit the filling of the tube with ether, I form a duct 28 in the terminal piece 12, said duct extending throughout the length thereof and communicating with the interior of said tube.

The terminal piece 12 has a pin 29 extending transversely therethrough and across the duct 28, and this pin may be inserted after the tube has been filled. Furthermore, this pin has one of its ends projecting beyond the outer surface of the terminal piece 12 and is designed to be extended through the slots 8 and 10 of the boss 6 and jacket 9 respectively so as to prevent rotation of the terminal piece 12.

Each of the heads 14 and 19 tapers toward the end which is within the tube 16, these tapered ends of the head acting as sheds for the solder so that the solder will be compelled to run down the sides of said head and not collect on the top thereof.

The tube 16 has a rib 30 pressed therein, said rib extending around the bend 31 of said tube and down the legs 32 and 33 thereof. This rib may be formed by corrugating the tube 16 and it has been found that it increases the amount of travel or movement of the valve holding end of said tube.

In Fig. 15, two ribs 34 and 35 are shown instead of the single rib as shown in Figs. 1, 3, 4, and 9. Furthermore, by providing the rib as above mentioned, the tube is greatly strengthened at its flexing portion and furthermore, a softer or inferior grade of metal may be used in the manufacture of the tube than if the rib were eliminated. However, even though a softer or inferior grade of metal is used, the provision of said rib renders the tube stronger and more efficient than a tube made out of a high grade metal without the provision of the rib, thus the formation of this rib is one of the important features of my invention.

As shown in Fig. 11, instead of having the groove in the terminal piece extending at an angle downwardly and inwardly, the groove 36 illustrated in said Fig. 11 extends directly in toward and at right angles with the longitudinal axis, thus undercutting the head 37. In this construction, the end of the thermo-acting tube will be bent or pressed within the groove 36 and thus secure it to the head 37.

In the form of my invention shown in Figs. 12, 13, and 14, instead of providing the jacket 9 and the cylindrical portion 11 on the terminal piece, the terminal piece 38 as illustrated in Fig. 14 has a flat tenon 39 which fits within a slot 40 in a boss 41 formed on the inner surface of a casing section 42.

In all respects the construction is similar to that described in connection with Figs. 1 to 10 inclusive, and I have therefore given similar parts corresponding reference numerals.

Prior to my invention, the terminal pieces for the thermostatic tubes were usually connected by solder, but the terminal pieces had no other connection with the tubes, thus depending entirely upon the solder or brazing material to secure the terminal pieces and the tube together.

By grooving the terminal pieces and bending the ends of the tubes within the grooves in accordance with my invention, a secure joint is attained and the solder serves as a seal and to add to the strength thereof.

Furthermore, the joint can be made extremely neat, since it is not necessary to have the solder extend on the outside of the joint, sufficient solder only being used to completely fill the portion of the groove not filled by the bent end of the tube and sufficient of the space between the head and the inner surface of the tube. This solder is illustrated at 43 on the several views of drawing.

Furthermore, with my invention it is extremely easy to remove or insert the thermo-acting tube within the casing 1, since when the cap 3 is removed from the casing, it is only necessary to lift the terminal piece 12 when the entire tube, terminal pieces, and valve can be removed from the casing, thus a very simple construction is provided.

It will be noted that by the provision of the screw-threads 27ª, the sleeve 27 may be readily removed merely by inserting a tool or rod of any description which has a screw-threaded end which would fit the screw-threads 27ª. In removing the said sleeve 27, the threaded end of said tool would be caused to engage the screw-threads 27ª of the sleeve 27 and the tool and sleeve could then be pulled out.

In the form of my invention shown in Fig. 16, the terminal piece 12ª has a hole 44 into which fits a spring tongue 45, the latter being cut out of a jacket 46. The jacket 46 can be forced into the bore 7 of the casing in a manner similar to that described in connection with the jacket 9, and when in this position the spring tongue 45 serves to prevent rotation of the terminal piece 12ª and also serves to prevent accidental lifting or raising movement of said terminal piece. In other words, instead of having a terminal piece secured by means of a pin, it may be secured by means of the spring tongue 45.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A thermo-acting member having a tubular end portion, and a terminal piece having an under-cut head extending into the tubular end portion, the inner end of said head being tapered toward its innermost end, said tubular end being bent inwardly around the under-cut portion of said head whereby the terminal piece and thermo-acting member are joined together, said head having a vent extending through the tapered end and communicating with the interior of said member, substantially as described.

2. The combination in a thermo-acting valve mechanism, of a substantially U-shaped thermo-acting member having tubular legs, solder within said legs, and terminal pieces each having a portion which, at a position within its length, substantially fits within an end of a respective leg of the thermo-acting member and which tapers toward its inner end within said leg, said tapered portions of the terminal pieces forming sheds for said solder around them whereby a complete seal between the terminal pieces and the legs is produced, substantially as described.

3. The combination in a thermo-acting valve mechanism of a substantially U-shaped tubular thermo-acting member having tubular legs, and terminal pieces each having a portion which at a position within its length substantially fits an end of a respective leg and which tapers toward its inner end within said leg, at least one of said tapered portions having a vent communicating with the interior of said member, substantially as described.

4. The combination in a thermo-acting valve mechanism, of a thermo-acting member having a tubular end, solder located within said tubular end, and a terminal piece having a groove formed therein, said end of the thermo-acting tubular portion being bent within said groove, said terminal piece having a flange for abutting the end of said tube and a portion extending into the tube and tapering inwardly to its innermost end, said terminal piece having portions adjacent the flange and substantially fitting the end of the tube, said tapered portion of the terminal piece forming a shed for said solder around it whereby a complete seal between the terminal piece and a tubular end of the thermo-acting member is produced, substantially as described.

5. The combination in a thermo-acting valve mechanism, of a thermo-acting member, a terminal piece secured to said member and having a tapered opening formed directly therein, a valve having a stem longitudinally movable within said tapered opening and having a portion narrower than the wide part of the tapered opening thereby permitting lateral movement of the stem within the terminal piece, and means for limiting the extent of longitudinal movement of said valve within said tapered opening, substantially as described.

6. The combination in thermo-acting valve mechanism, of a thermo-acting member, a terminal piece secured to said member and having a tapered opening therein, a valve having a stem located within said tapered opening, said valve stem having an annular groove, and means projecting into said tapered opening and into the groove of the valve stem whereby the longitudinal movement of said valve stem is limited and a lateral movement of said valve stem is permitted, substantially as described.

7. A thermo-acting member having a tubular end portion, solder located within said tubular end portion, and a terminal piece having a head extending into said tubular end portion, said head being tapered toward its innermost end, said tapered head forming a shed for said solder around it whereby a complete seal between the head and the tubular end portion is produced, substantially as described.

In testimony whereof I have signed my name to this specification in the presence of two subscribing witnesses.

JOHN D. BANKS.

Witnesses:
E. P. ALLEN,
CHAS. E. POTTS.

Copies of this patent may be obtained for five cents each, by addressing the "Commissioner of Patents, Washington, D. C."